United States Patent [19]

Genini et al.

[11] 4,364,418

[45] Dec. 21, 1982

[54] FLEXIBLE TUBULAR CONDUIT

[75] Inventors: Maurice Genini, Creteil; Christian Athe, Le Mee; Jean-Paul Aubert, Puteaux, all of France

[73] Assignee: Coflexip, Rueil Malmaison, France

[21] Appl. No.: 27,719

[22] Filed: Apr. 6, 1979

[30] Foreign Application Priority Data

Apr. 17, 1978 [FR] France .................... 78 11230

[51] Int. Cl.³ .................................... F16L 11/08
[52] U.S. Cl. .................... 138/103; 138/111; 138/134; 138/150; 138/156; 174/47
[58] Field of Search .......... 174/47, 68 C; 138/103, 138/114, 134, 150, 111, 156, 136, 135

[56] References Cited

U.S. PATENT DOCUMENTS 2,028,793  1/1936  Mascuch ...................... 138/136
3,603,719  9/1971  Lejeune ........................ 138/130
3,687,169  8/1972  Reynard ....................... 138/134
4,019,539  4/1977  Hoffmann et al. ............. 138/134

FOREIGN PATENT DOCUMENTS 565101   3/1958  Belgium ....................... 174/47
676224   7/1952  United Kingdom .......... 174/47
1310419  3/1973  United Kingdom ........ 174/68 C Primary Examiner—Steven L. Stephan
Attorney, Agent, or Firm—Brisebois & Kruger

[57] ABSTRACT

A flexible conduit with a quadrangular hollow casing-shaped wire in the side wall of the conduit and extending the length of the conduit. The casing-shaped wire has at one side bent unjoined and overlapping extremities of the metal strip from which the wire is formed and is capable of receiving a hydraulic or electrical control line therein.

10 Claims, 2 Drawing Figures

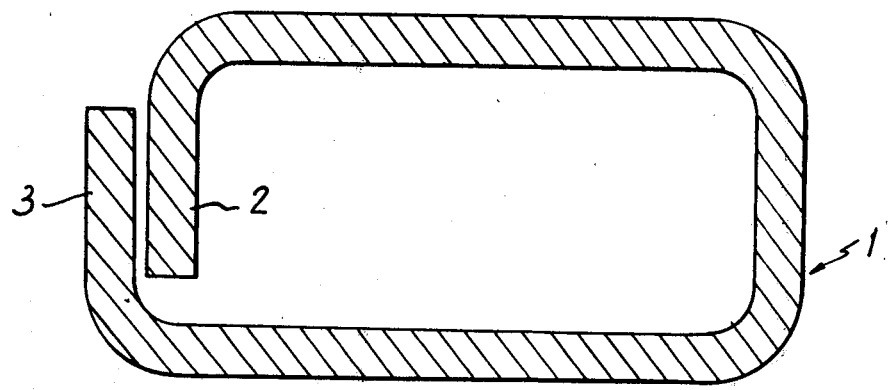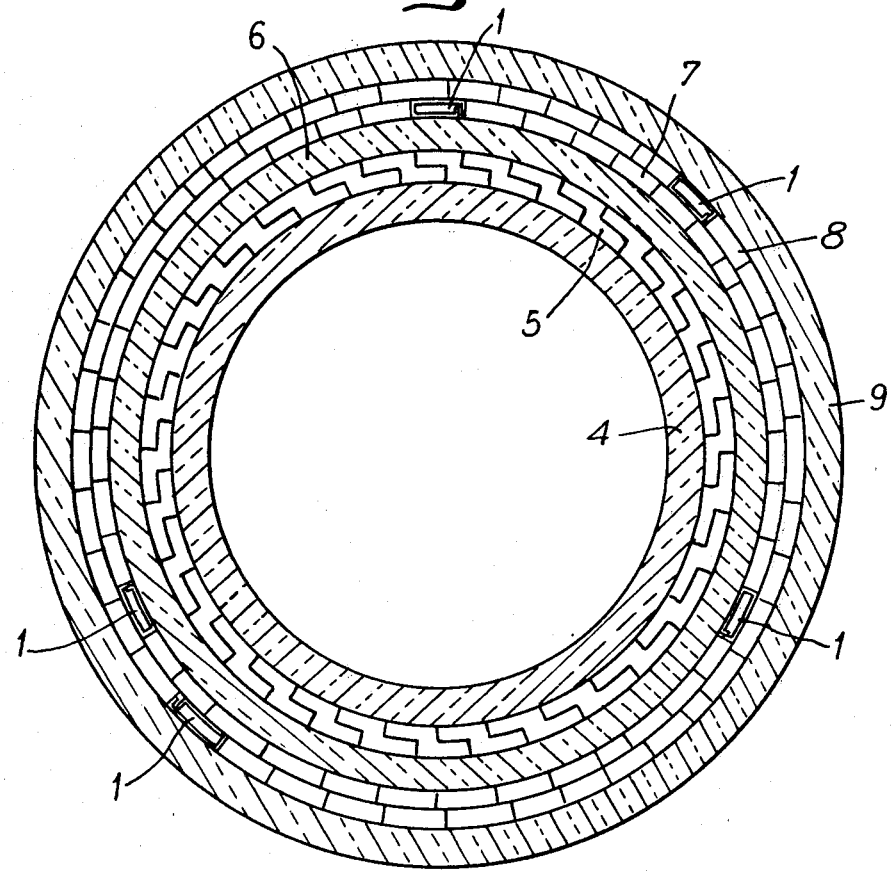

FLEXIBLE TUBULAR CONDUIT

SUMMARY OF THE INVENTION

The present invention relates to a flexible tubular conduit particularly useful in "offshore" oil exploitation.

Many types of flexible tubular conduits are already known and used in the offshore oil industry especially for flexodrilling or as flow lines, for the collection of hydrocarbons at production sites and their raising to the surface.

Thus the applicants assignee Company has already proposed and makes commercially, flexible tubular pipes and conduits able to be made in very long lengths and having at least one sheathing or reinforcing layer and preferably two sheathing layers, constituted of shaped or profiled metallic wires filaments, or continuous strips wound helically with respect to the longitudinal axis of the conduit, the wires of one sheathing layer being crossed with respect to the wires of the other layer, an external liquid-tight sheath and an internal liquid-tight sheath, the tubular conduit also advantageously comprising a carcass or reinforcement constituted, for example, of metal strips of hooked S or Z sections, a liquid-tight sheath being interposed between the carcass and the sheathing layer or layers. The liquid-tight sheath should preferably be made of a polyamide such as that known under the name "RILSAN".

An object of the present invention is a tubular conduit of this type characterized by the fact that is has preferably in one of the sheathing layers, at least one hollow metallic wire or strip in the form of a casing, basically quadrangular in section, able to hold a transmission line for control fliud, or in particular an electric line made in the usual way of a metallic core, for example of copper or brass enclosed in a liquid-tight sheath.

Preferably the casing-shaped wire according to the invention is constituted of a strip bent back so that its ends overlap without being joined to each other along one side of the wire perpendicular to its base. The casing-shaped wire also, due to its structure, strongly resists crushing in a radial direction, thus largely avoiding risks of damaging the fluid control lines electrical cables which it can contain.

Preferably according to the invention several such casing-shaped wires are placed in each of the layers of sheathing wires, the casing-shaped wires being wound helically with respect to the longitudinal axis of the pipe parallel to the wires of the sheathing layer in which they are placed. Placement of these casing-shaped wires is accomplished simply by winding during the manufacture of the sheathing layers.

Preferably the casing-shaped wires according to the invention are made of stainless steel, but they could be made of any material appropriate for the intended use. In order to make the invention more clearly understood, one embodiment will now be described as an entirely non-limiting example with reference to the attached drawings in which:

FIG. 1 shows in section a casing-shaped wire usable within the scope of the invention.

FIG. 2 shows in section a flexible tubular pipe of flexodrilling containing several casing-shaped wires according to FIG. 1. Referring to FIG. 1 a caisson-shaped wire or filament 1 is shown, constituted of a stainless steel strip bent back upon itself, the strip being so bent that its longitudinal edges 2 and 3 overlap without however being joined to each other. The bending in this case is so done that edges 2 and 3 overlap along the length of one short side of the basically rectangular casing which is made with slightly rounded corners.

It will be seen that with such a structure, under radial pressure forces, especially crushing forces acting on the long sides of the rectangular casing, a certain relative displacement of the long sides of the caisson in a radial direction is permitted, thus avoiding damage to the line elements which it may contain.

Although it is not shown on the drawing, it should be understood that the caisson-shaped wire may enclose in particular electrical transmission lines, consisting for example of a metallic core of copper of some similar material surrounded by one or more liquid-tight sheaths, the lines being inside the caisson-shaped structure.

FIG. 2 shows by way of example a flexible tubular pipe of flexodrilling using several casing-shaped wires similar to that shown on FIG. 1.

The flexible tubular pipe shown on FIG. 2 comprises from the inside out, an internal liquid-tight sheath 4 made for example of a polyamide such as RILSAN, a casing 5 made by hooked metallic wires of S or Z sections with overlapping adjacent spirals an intermediate liquid-tight sheath 6, advantageously of the same material as sheath 4, two sheathing layers 7 and 8 each consisting of wires of flat section wound helically, with crossed winding axes, to give the pipe high pull resistance, and an external liquid-tight sheath 9, advantageously made of the same material as sheaths 4 and 6.

As may be seen on FIG. 2, each of the sheathing layers 7 and 8 have casing-shaped wires similar to those shown on FIG. 1.

Thus the internal sheathing layer 7 has three such casing-shaped wires and the external layer 8 has two. Of course the number of casing-wires in the layers may be varied.

In the same way it should be understood that the casing-shaped wires do not necessarily have to be made in the sheathing layers and inserted between their wires, but may be placed in any appropriate location within the conduit wall.

Although the invention has been described in connection with one particular embodiment, it is in no way limited to this and various modifications can be made particularly in shape and materials without exceeding either the scope or the spirit of the invention.

What is claimed is:

1. A flexible tubular conduit comprising a side wall, and means in said side wall for containing therein a control line, said means comprising at least one hollow wire comprising a metal strip bent into the form of a quadrangular casing with one side thereof having overlapping unjoined extremities, said wire extending a substantial distance along the length of said conduit for receiving the control line.

2. Flexible tubular conduit according to claim 1, further comprising at least one reinforcing layer of metallic wires, and wherein said hollow casing-shaped wire is disposed between the wires of the reinforcing layer.

3. Flexible tubular conduit according to claim 2 in which the wires of the reinforcing layers are wound helically with respect to the longitudinal axis of the conduit, and wherein there are plural casing-shaped wires each wound helically with respect to the longitudinal axis of the pipe and parallel to the wires of the reinforcing layer in which they are disposed.

4. Flexible tubular conduit according to claim 2 wherein said casing-shaped wires are spaced apart from each other by the metallic wires of the reinforcing layer.

5. Flexible tubular conduit according to claim 1 wherein said overlapping unjoined extremities of said casing shaped wires extend radially of said conduit.

6. Flexible tubular conduit according to claim 1 wherein said quadrangular casing comprises, a casing having first and second opposed sides joined to a third side along bend lines, said third side being opposed to said one side.

7. Flexible tubular conduit comprising a side wall comprised of an internal liquid-tight sheath, a casing of interlocked metallic wires of S or Z sections with overlapping adjacent turns, an intermediate liquid-tight sheath, two reinforcing layers each comprising shaped wires wound helically with crossed winding axes, and means in one of said helically wound layers of said sidewall for containing therein a control line, said means comprising at least one hollow wire in the form of a quadrangular casing in section and extending a substantial distance along the length of said conduit for receiving the control line, and an external liquid-tight sheath, and wherein the quadrangular casing-shaped wire comprises a metal strip bent into the form of a quadrangle with one side thereof having overlapping unjoined extremities.

8. Flexible tubular conduit according to claim 7, wherein said casing-shaped wire is of stainless steel.

9. Flexible tubular conduit according to claim 7, wherein said hollow casing-shaped wire is disposed between the wires of a reinforcing layer.

10. Flexible tubular conduit according to claim 9, wherein plural casing-shaped wires are wound helically with respect to the longitudinal axis of the pipe parallel to the wires of the reinforcing layer in which they are placed.

* * * * *